US011784530B2

United States Patent
Hirai et al.

(10) Patent No.: US 11,784,530 B2
(45) Date of Patent: Oct. 10, 2023

(54) ROTATING ELECTRIC MACHINE AND ARMATURE

(71) Applicant: DENSO CORPORATION, Kariya (JP)

(72) Inventors: Kensuke Hirai, Kariya (JP); Tomoyuki Okamura, Kariya (JP); Tadahiro Kurasawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 29 days.

(21) Appl. No.: 17/512,025

(22) Filed: Oct. 27, 2021

(65) Prior Publication Data
US 2022/0140686 A1    May 5, 2022

(30) Foreign Application Priority Data
Oct. 29, 2020    (JP) ................. 2020-181140

(51) Int. Cl.
| H02K 3/50 | (2006.01) |
| H02K 3/52 | (2006.01) |
| H02K 5/22 | (2006.01) |
| H02K 3/38 | (2006.01) |

(52) U.S. Cl.
CPC ............... *H02K 3/50* (2013.01); *H02K 3/38* (2013.01); *H02K 3/52* (2013.01); *H02K 5/225* (2013.01); *H02K 2203/09* (2013.01)

(58) Field of Classification Search
CPC .......... H02K 3/52; H02K 3/521; H02K 3/522; H02K 3/50; H02K 2203/09; H02K 5/225; H02K 5/22; H02K 3/28; H02K 3/38; H02K 3/46; F16B 19/02
USPC ........................................................ 310/71
See application file for complete search history.

(56) References Cited

U.S. PATENT DOCUMENTS

| 2,028,528 A | 1/1936 | Sipe |
| 6,137,198 A | 10/2000 | Kawamura |
| 2005/0253466 A1 | 11/2005 | Seguchi et al. |
| 2012/0235524 A1 | 9/2012 | Sasaki et al. |
| 2015/0364955 A1 | 12/2015 | Aumann |

FOREIGN PATENT DOCUMENTS

| CN | 201627798 U | 11/2010 | |
| EP | 3280034 A1 * | 2/2018 | ............... H02K 3/50 |
| EP | 3 451 506 A1 | 3/2019 | |
| FR | 3 053 543 A1 | 1/2018 | |
| JP | S50-139201 U | 11/1975 | |
| JP | H05-308742 A | 11/1993 | |
| JP | 5996917 B2 | 9/2016 | |
| JP | 2019-110676 A | 7/2019 | |

OTHER PUBLICATIONS

Duquesne et al, Rotary Electric Motor Provided with an Interconnector Having Supporting Jacks, Feb. 7, 2018, EP 3280034 (English Machine Translation) (Year: 2018).*
The U.S. Appl. No. 17/512,029, filed Oct. 27, 2021 in the name of Tomoyuki Okamura et al.

* cited by examiner

*Primary Examiner* — Alexander A Singh
(74) *Attorney, Agent, or Firm* — Oliff PLC

(57) ABSTRACT

A rotating electric machine includes an armature and a busbar unit. The armature includes an annular armature core and a multi-phase armature coil wound on the armature core. The busbar unit is configured to connect winding end portions of the armature coil which are arranged apart from one another in a circumferential direction of the armature. Moreover, the busbar unit is fixed to a back yoke of the armature core by a plurality of pins.

21 Claims, 7 Drawing Sheets

ROTATING ELECTRIC MACHINE AND ARMATURE

CROSS-REFERENCE TO RELATED APPLICATION

This application is based on and claims priority from Japanese Patent Application No. 2020-181140 filed on Oct. 29, 2020, the entire contents of which are hereby incorporated by reference into this application.

BACKGROUND

1 Technical Field

The present disclosure relates to rotating electric machines and armatures.

2 Description of Related Art

There are known rotating electric machines that include an armature having a multi-phase armature coil wound on an armature core. Moreover, there is disclosed, for example in Japanese Patent No. JP 4069425 B2, a method of forming the armature coil by: (1) inserting, from one axial side of the armature core, both leg portions of each of substantially U-shaped coil segments into corresponding slots of the armature core; and (2) joining each corresponding pair of those parts of the leg portions of the coil segments which protrude outside the corresponding slots on the other axial side of the armature core. Furthermore, the coil segments forming the armature coil, which are arranged apart from one another in a circumferential direction, are connected to power wires via busbars; the power wires are further connected to an inverter.

SUMMARY

According to the present disclosure, there is provided a rotating electric machine which includes an armature and a busbar unit. The armature includes an annular armature core and a multi-phase armature coil wound on the armature core. The busbar unit is configured to connect winding end portions of the armature coil which are arranged apart from one another in a circumferential direction of the armature. Moreover, the busbar unit is fixed to a back yoke of the armature core by a plurality of pins.

DESCRIPTION OF EMBODIMENTS

Figure 1:
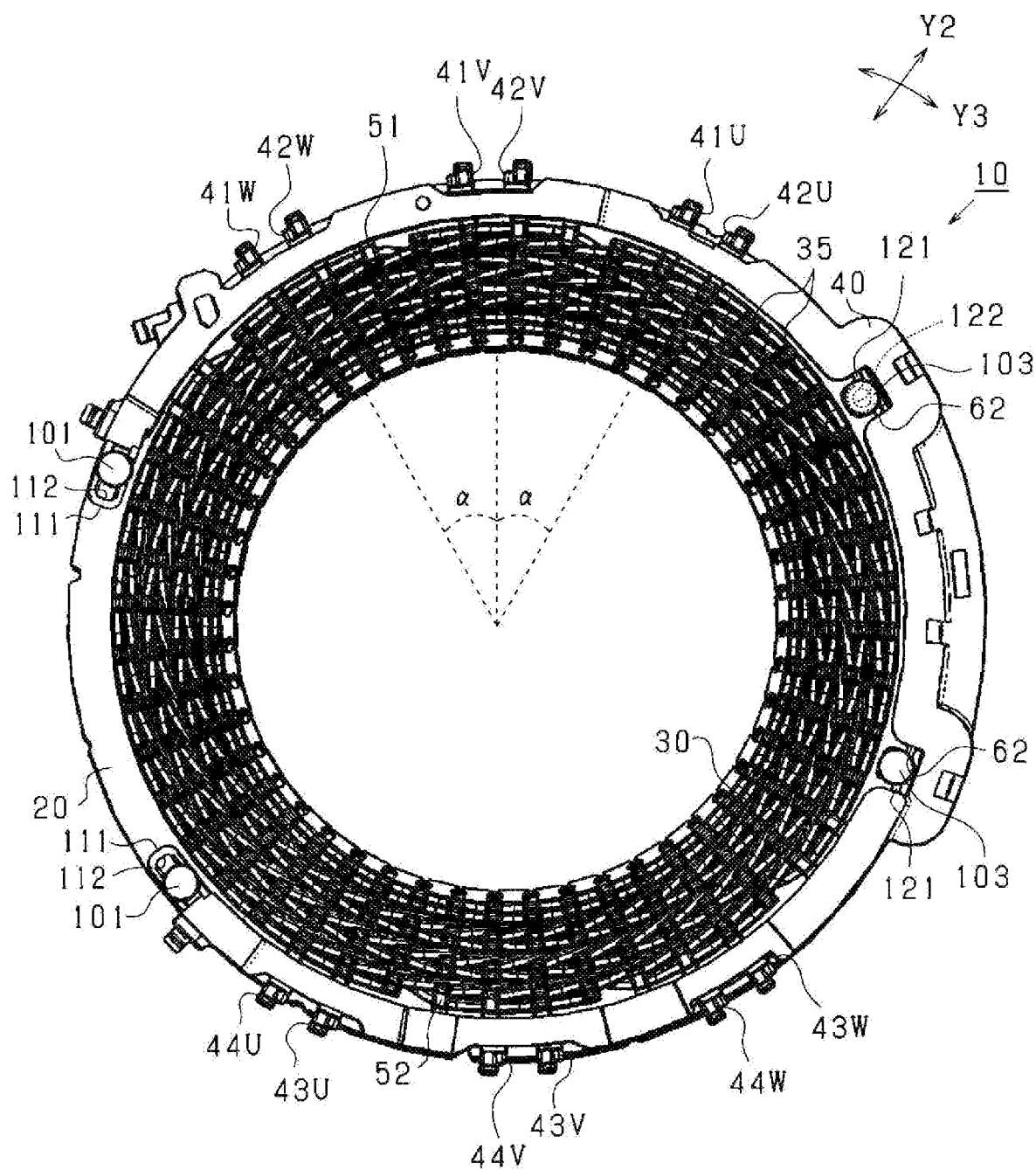
FIG. 1 is a plan view of a stator of a rotating electric machine according to an exemplary embodiment.

According to the disclosure of the aforementioned patent document (i.e., Japanese Patent No. JP 4069425 B2), a terminal block, which has a busbar group resin-molded therein, is connected and fixed to a coil end of the armature coil. More specifically, a plurality of winding end portions of the armature coil, which protrude axially outward from the coil end, are respectively joined to the busbars of the terminal block. Consequently, the terminal block is mounted on the coil end so as to be supported by the winding end portions.

However, the material and thickness of the armature coil are set according to the specifications (e.g., the size and the output) of the rotating electric machine. Moreover, the mechanical strength of the winding end portions depends on the material and thickness of the armature coil. When the mechanical strength of the winding end portions is insufficient to support the terminal block, vibration and/or deformation may be caused by external force. Further, upon application of a load due to vibration or the like directly to the joints between the winding end portions and the busbars, the joints may be damaged and thus the winding end portions may be detached from the busbars.

The present disclosure has been accomplished in view of the above problems.

With the configuration of the above-described rotating electric machine according to the present disclosure, it becomes possible to fix the busbar unit to the back yoke of the armature core, thereby suppressing vibration of the busbar unit. Moreover, with the busbar unit fixed to the back yoke of the armature core, it becomes possible to prevent a load such as vibration or the like from being directly applied to joints between the winding end portions of the armature coil and busbars of the busbar unit. Furthermore, it is easy to form the pins to be more elongate than screws. With the busbar unit fixed to the back yoke of the armature core by the elongate pins, it becomes possible to suppress the pins from impeding the flow of magnetic flux through the back yoke of the armature core. In addition, with the elongate pins, it also becomes possible to fix the busbar unit to such as a narrow area as the back core.

In a further implementation, the busbar unit may include at least one first mounting member that has an insertion hole formed along an axial direction of the armature. The armature core may have at least one first pin hole formed in the back yoke thereof. The plurality of pins may include at least one first pin that has a collar-shaped head portion formed at one end thereof. The first pin may be inserted through the insertion hole of the first mounting member and has a distal end portion thereof press-fitted in the first pin hole. The first mounting member may be placed in pressed contact with the armature core by being pressed by the head portion of the first pin to the armature core side in the axial direction.

With the above configuration, it would be possible to prevent the busbar unit and the armature core from being displaced relative to each other. Further, it would also become possible to suppress vibration of the busbar unit and the application of a load to the joints between the winding end portions of the armature coil and the busbars of the busbar unit due to displacement of the busbar unit relative to the armature core. Moreover, forming the first mounting member with a material (e.g., iron, aluminum or stainless steel) harder than resin, it would be possible to more effectively suppress vibration of the busbar unit and displacement of the busbar unit relative to the armature core.

In the rotating electric machine according to the further implementation, the busbar unit may be formed in an arc shape along the circumferential direction. The at least one first mounting member may include a pair of first mounting members provided respectively at opposite circumferential ends of the busbar unit. The at least one first pin hole may include a pair of first pin holes respectively corresponding to the pair of first mounting members. The at least one first pin may include a pair of first pins respectively corresponding to the pair of first mounting members and the pair of first pin holes. The distance between the pair of first pin holes may be different from, more particularly shorter than the distance between the insertion holes of the pair of first mounting members before the fixing of the busbar unit to the back yoke of the armature core.

With the above configuration, when the first pins are pressed-fitted into the corresponding first pin holes through the insertion holes of the corresponding first mounting members, the busbar unit would be bent (or deformed) to have the circumferential ends thereof become closer to each other in the circumferential direction. Consequently, the busbar unit would be fixed, in a state of being urged by an elastic force to spread in the circumferential direction, to the back yoke of the armature core. As a result, it would become possible to suppress, with the elastic force, vibration of the busbar unit. Moreover, it would also become possible to increase the frictional force between the first pins and the insertion holes of the corresponding first mounting members, thereby more effectively suppressing displacement of the busbar unit relative to the armature core.

In the rotating electric machine according to the further implementation, the busbar unit may be formed in an arc shape along the circumferential direction. The at least one first mounting member may include a pair of first mounting members provided respectively at opposite circumferential ends of the busbar unit along the circumferential direction. The at least one first pin hole may include a pair of first pin holes respectively corresponding to the pair of first mounting members. The at least one first pin may include a pair of first pins respectively corresponding to the pair of first mounting members and the pair of first pin holes. Each of the insertion holes of the first mounting members may be formed to have an elongate shape along the circumferential direction so as to allow circumferential movement of the corresponding first pin in the insertion hole while restraining radial movement of the corresponding first pin.

With the above configuration, each of the first mounting members would extend along the circumferential direction without protruding radially outward. Consequently, it would become possible to minimize the size of the busbar unit. Moreover, with circumferential play (or clearance) provided in each of the insertion holes of the first mounting members, it would become easy to adjust the circumferential position of the busbar unit, facilitating the fixing of the busbar unit to the back yoke of the armature core. For example, it would become easy to adjust the circumferential position of the busbar unit in the process of joining the winding end portions of the armature coil to the busbars of the busbar unit.

In the rotating electric machine according to the further implementation, the busbar unit may be formed in an arc shape along the circumferential direction. In the busbar unit, there may be formed at least one recessed portion that is recessed radially outward from a radially inner periphery of the busbar unit and located to closer to a circumferential center of the busbar unit than to a circumferential end of the busbar unit. The busbar unit may further include at least one second mounting member that is received in the recessed portion of the busbar unit. The second mounting member may have an engaging recess that is radially recessed. The armature core may further have at least one second pin hole formed in the back yoke thereof. The plurality of pins may also include at least one second pin that has a collar-shaped head portion formed at one end thereof. The second pin may have the head portion thereof axially engaging with the second mounting member, a body thereof received in the engaging recess of the second mounting member so as to circumferentially engage with the second mounting member, and a distal end portion thereof press-fitted in the second pin hole. The second mounting member may be placed in pressed contact with the armature core by being pressed by the head portion of the second pin to the armature core side in the axial direction.

With the above configuration, it would become possible to suppress circumferential displacement of the busbar unit relative to the armature core. Consequently, it would become possible to prevent the joints between the winding end portions of the armature coil and the busbars of the busbar unit from being damaged due to circumferential displacement of the busbar unit relative to the armature core. As a result, it would become possible to prevent the winding end portions of the armature coil from being detached from the busbars of the busbar unit.

Further, in the above case, the distance between the insertion hole of the first mounting member and the engaging recess of the second mounting member before the fixing of the busbar unit to the back yoke of the armature core may be different from, more specifically longer than the distance between the first pin hole and the second pin hole.

With the above configuration, it would become possible to have a portion of the busbar unit, which is located between the insertion hole and the engaging recess, bent during the fixing of the busbar unit to the back yoke of the armature core. Consequently, the busbar unit would be fixed, in a state of being urged by an elastic force to spread in the circumferential direction, to the back yoke of the armature core. As a result, it would become possible to suppress, with the elastic force, vibration of the busbar unit. Moreover, it would also become possible to reliably have the second pin received in and engaging with the engaging recess of the second mounting member.

In the rotating electric machine according to the present disclosure, the armature core may have a plurality of slots formed at predetermined intervals in the circumferential direction. The armature coil may be wound on the armature core so as to be received in the slots of the armature core. In the back yoke of the armature core, there may be formed a plurality of pin holes in which distal end portions of the plurality of pins are respectively fitted. Each of the plurality of pin holes may be located between an adjacent pair of the slots of the armature core in the circumferential direction.

With the above configuration, it would become possible to prevent the pin holes from impeding the flow of magnetic flux through the back yoke of the armature core. Moreover, the radial thickness of those portions of the armature core which are located between the slots in the circumferential direction would be larger than the radial thickness of those portions of the armature core where the slots are respectively formed. Therefore, with the above location of the pin holes, it would be possible to ensure sufficient strength of the armature core.

In the rotating electric machine according to the present disclosure, the busbar unit may include at least one elastically-deformable buffer member that is provided to protrude from an armature-core-side surface of the busbar unit to the armature core side in the axial direction. The buffer member may be configured to absorb mechanical shock when it makes contact with the armature core.

Consequently, with the buffer member, it would become possible to suppress vibration of the busbar unit.

In the rotating electric machine according to the present disclosure, in the back yoke portion of the armature core, there may be formed a plurality of pin holes in which distal end portions of the plurality of pins are respectively fitted. The plurality of pin holes may have a smaller diameter than the distal end portions of the plurality of pins.

Consequently, it would become possible to reliably press-fit the distal end portions of the pins respectively into the pin holes.

In the rotating electric machine according to the present disclosure, each of the plurality of pins may have a collar-shaped head portion formed at one end thereof. Moreover, each of the plurality of pins may also have at least one of a first rotational-movement restraining mechanism provided on a bearing surface of the head portion thereof and a second rotational-movement restraining mechanism provided on a body thereof.

Consequently, with the at least one of the first and second rotational-movement restraining mechanisms, it would become possible to prevent the pins from being loosened due to rotational movement thereof.

In the rotating electric machine according to the present disclosure, the armature coil may include a plurality of phase windings for respective phases. The busbar unit may include a plurality of busbars each of which is configured to connect the winding end portions of a corresponding one of the phase windings of the armature coil.

According to another aspect of the present disclosure, there is provided an armature which includes an annular armature core, a multi-phase armature coil wound on the armature core, and a busbar unit configured to connect winding end portions of the armature coil which are arranged apart from one another in a circumferential direction of the armature. Moreover, the busbar unit is fixed to a back yoke of the armature core by a plurality of pins.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

FIG. 1 shows the overall structure of a stator 10 of a rotating electric machine according to an exemplary embodiment.

In the present embodiment, the rotating electric machine is configured as an electric motor for use in a vehicle. Specifically, the electric motor is a three-phase permanent magnet synchronous motor. The electric motor includes the stator 10 shown in FIG. 1, which is cylindrical-shaped and serves as an armature, and a rotor (not shown in the drawings) that is rotatably disposed radially inside the stator 10 and serves as a field system.

In the present embodiment, the rotor may have any well-known configuration. For example, the rotor may be configured as either an IPM (Interior Permanent Magnet) rotor or an SPM (Surface Permanent Magnet) rotor. Moreover, the rotor may alternatively be configured as a field coil type rotor. In addition, the rotor is disposed relative to the stator 10 so as to be rotatable about an axis of rotation.

In the present embodiment, the axial direction (indicated by an arrow Y1 in the drawings) denotes the axial direction of the cylindrical stator 10, i.e., the direction in which the axis of rotation of the rotor extends. The radial directions (indicated by an arrow Y2 in the drawings) denote the radial directions of the cylindrical stator 10, i.e., the directions of extending radially from the axis of rotation of the rotor. The circumferential direction (indicated by an arrow Y3 in the drawings) denotes the circumferential direction of the cylindrical stator 10, i.e., the direction of extending along a circle whose center is on the axis of rotation of the rotor.

Figure 2:
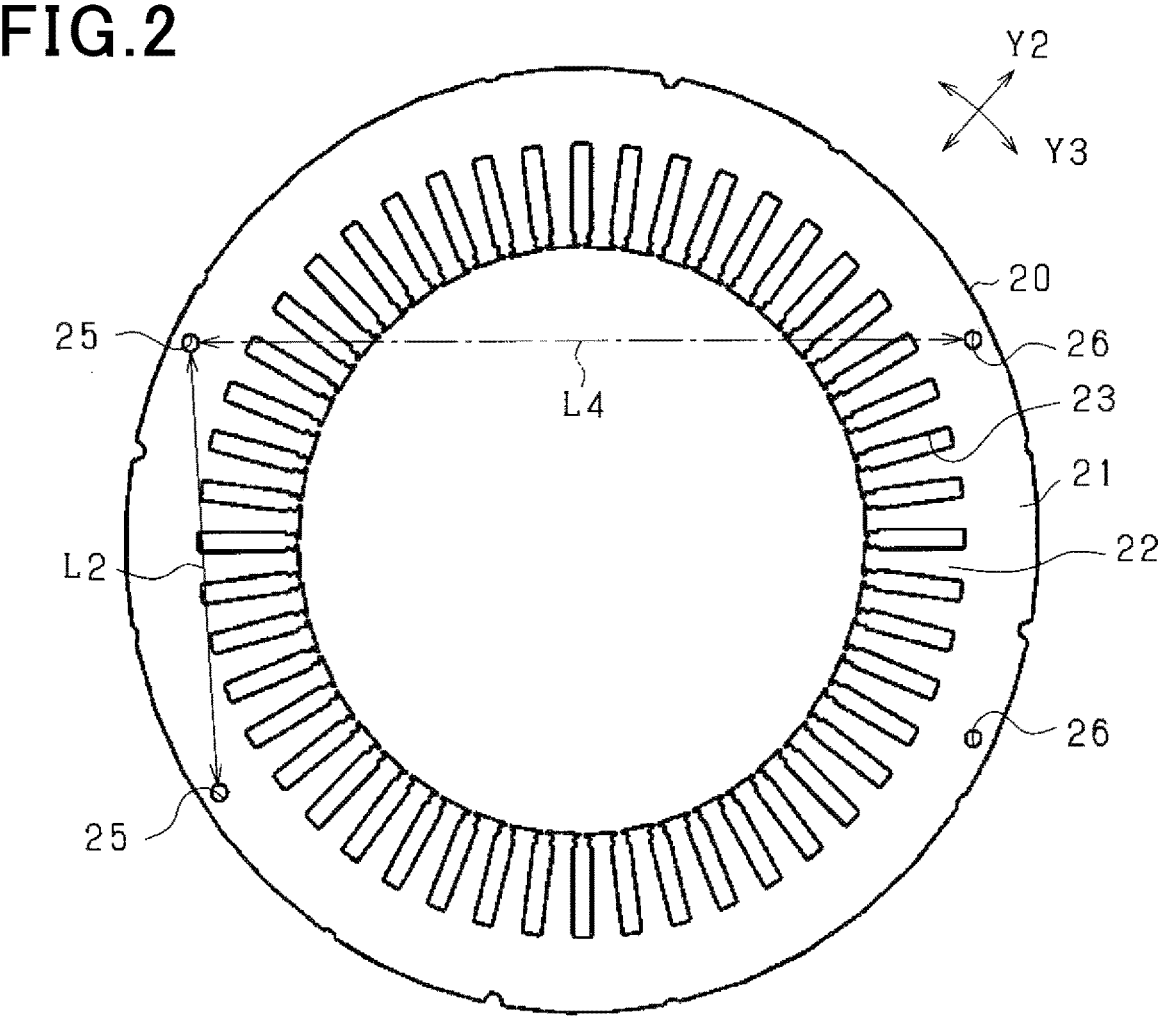
FIG. 2 is a plan view of a stator core of the stator.

As shown in FIGS. 1 and 2, the stator 10 includes an annular stator core 20 that is arranged radially outside the rotor so as to radially face the rotor, a three-phase stator coil 30 wound on the stator core 20, and a busbar unit 40 configured to connect winding end portions of the stator coil 30. In addition, in the present embodiment, the stator core 20 serves as an armature core while the stator coil 30 serves as an armature coil.

As shown in FIG. 2, the stator core 20 has an annular back yoke (or back core) 21, a plurality of teeth 22 and a plurality of slots 23. The teeth 22 each protrude radially inward from the back yoke 21 and are arranged at predetermined intervals in the circumferential direction Y3. Each of the slots 23 is formed between a circumferentially-adjacent pair of the teeth 22. More particularly, in the present embodiment, the slots 23 are formed in the stator core 20 at equal intervals in the circumferential direction Y3. In addition, the stator coil 30 is wound around the teeth 22 so as to be received in the slots 23.

In the present embodiment, the stator coil 30 is formed by inserting, from a first axial side of the stator core 20, a plurality of substantially U-shaped electrical conductor segments 35 into the slots 23 of the stator core 20 and joining each corresponding pair of end portions of the electrical conductor segments 35 which protrude outside the slots 23 on a second axial side of the stator core 20. Each of the electrical conductor segments 35 is obtained by cutting and plastically deforming an electrical conductor, which has a substantially rectangular cross-sectional shape and a constant thickness, into the substantially "U" shape. In addition, the above method of forming the stator coil 30 is well-known in the art; therefore, detailed explanation of the method is omitted hereinafter.

Figure 3:
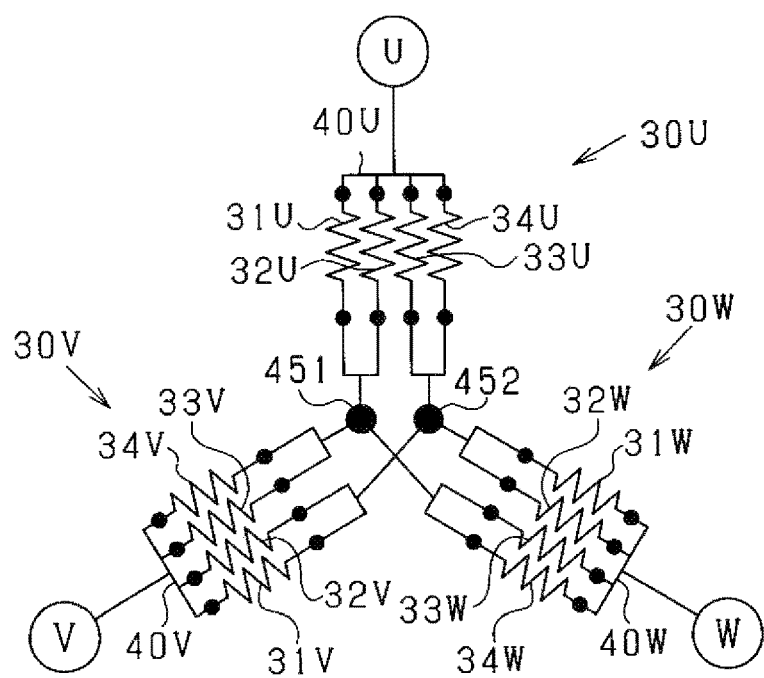
FIG. 3 is a connection diagram of a stator coil of the stator.

As shown in FIG. 3, in the present embodiment, the stator coil 30 includes a U-phase winding 30U, a V-phase winding 30V and a W-phase winding 30W that are Y-connected (or star-connected) together. Each of the U-phase, V-phase and W-phase windings 30U, 30V and 30W is constituted of four partial windings that are connected in parallel with each other. More specifically, the U-phase winding 30U is constituted of four partial windings 31U-34U that are connected in parallel with each other; the V-phase winding 30V is constituted of four partial windings 31V-34V that are connected in parallel with each other; and the W-phase winding 30W is constituted of four partial windings 31W-34W that are connected in parallel with each other.

The stator coil 30 is connected, via an electric power converter such as an inverter (not shown in the drawings), to an electric power supply such as a battery pack (not shown in the drawings). The stator coil 30 generates magnetic flux upon being supplied with electric power (more specifically, three-phase AC power) from the electric power supply via the electric power converter.

In the stator coil 30, the U-phase, V-phase and W-phase windings 30U, 30V and 30W are connected to power wires via the busbar unit 40; the power wires are further connected to the electric power converter. Moreover, the U-phase, V-phase and W-phase windings 30U, 30V and 30W are Y-connected via the busbar unit 40.

Figure 4:
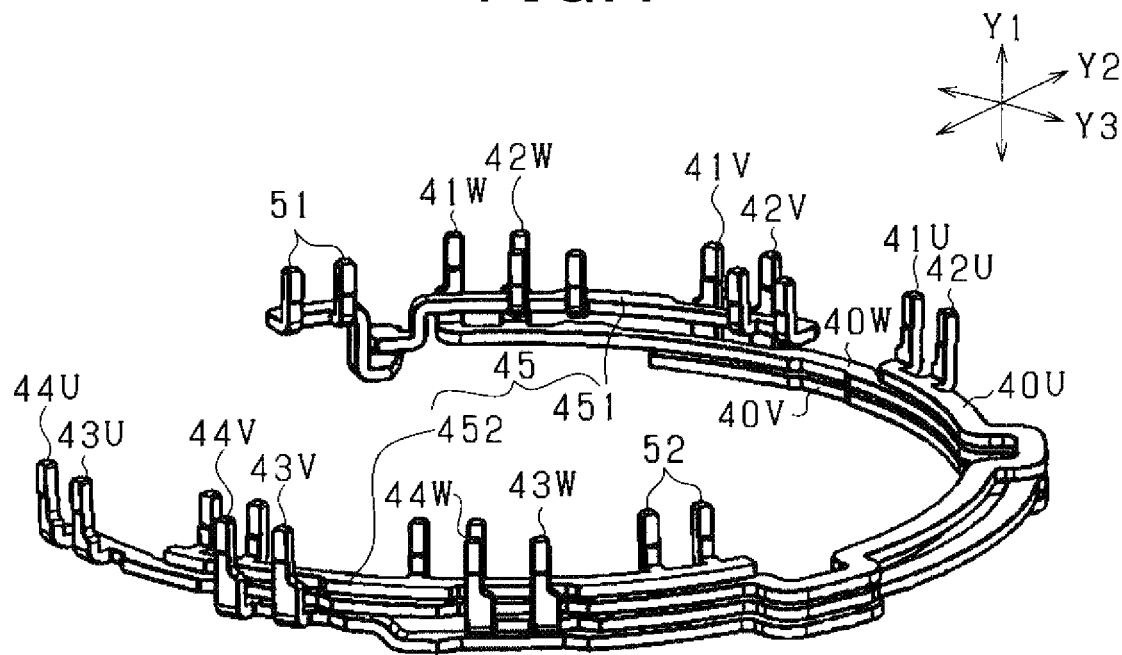
FIG. 4 is a perspective view showing the stacked state of busbars in a busbar unit of the stator.
Figure 5:
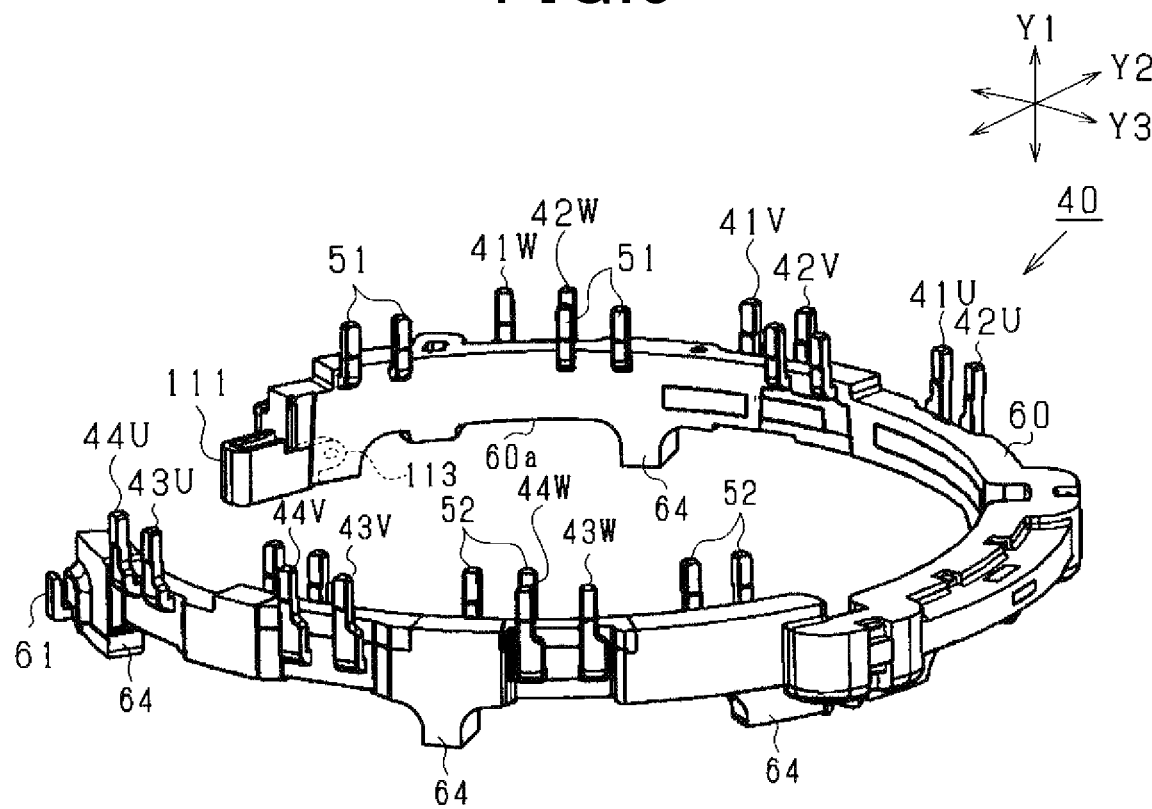
FIG. 5 is a perspective view of the busbar unit.
Figure 6:
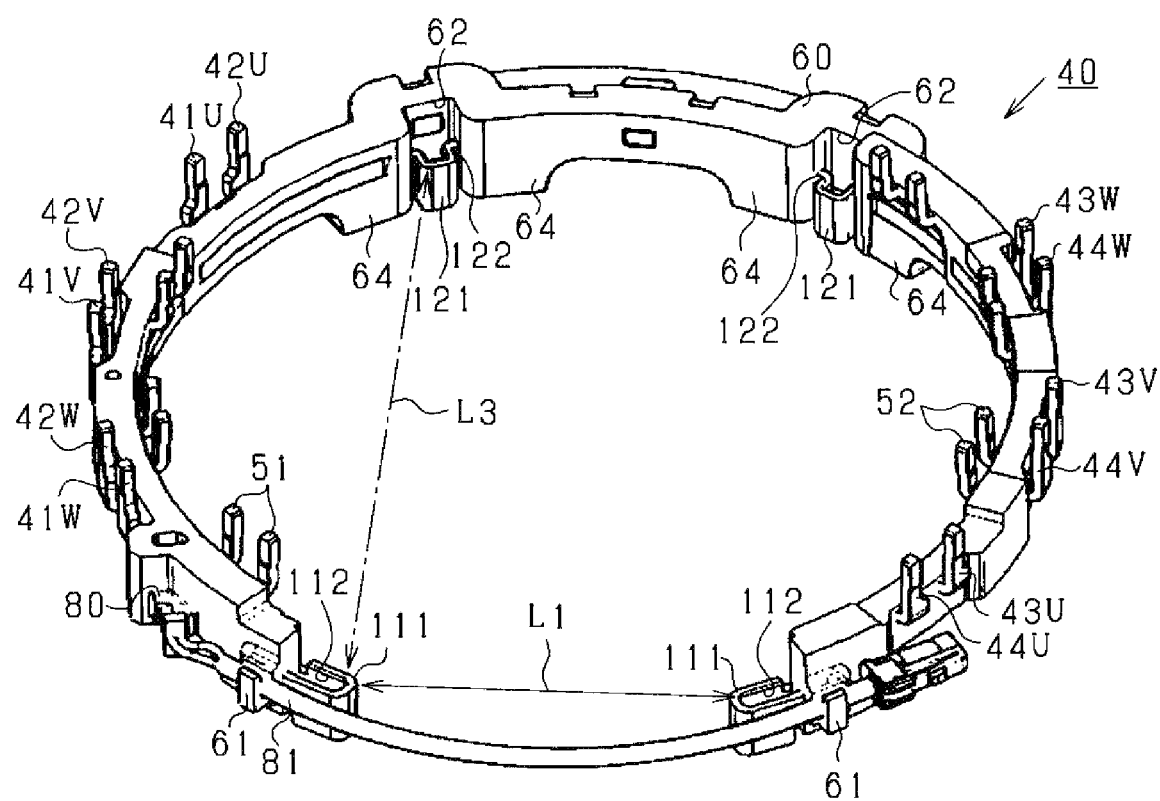
FIG. 6 is another perspective view of the busbar unit.

As shown in FIG. 4, the busbar unit 40 includes: a U-phase busbar 40U for connecting end portions of the partial windings 31U-34U of the U-phase winding 30U; a V-phase busbar 40V for connecting end portions of the partial windings 31V-34V of the V-phase winding 30V; a W-phase busbar 40W for connecting end portions of the partial windings 31W-34W of the W-phase winding 30W; and a neutral busbar 45 for forming a neutral line (or neutral point) of the stator coil 30. Moreover, as shown in FIGS. 4-6, all of the U-phase, V-phase and W-phase busbars 40U-40W and the neutral busbar 45 are stacked in the axial direction Y1 and together covered by a resin member 60, thereby being integrated into one piece.

Referring back to FIG. 1, in the present embodiment, the busbar unit 40 is arranged on one axial side of the stator core 20 and fixed to the back yoke 21 of the stator core 20 by a pair of first pins 101 and a pair of second pins 103. Here, the first pins 101 and the second pins 103 serve as fixing members. Moreover, the busbar unit 40 is located radially outside the stator coil 30 and within the range of the radial dimension of the back yoke 21 of the stator core 20. In addition, the busbar unit 40 is located also within the range of the axial dimension of a coil end of the stator coil 30. Here, the coil end denotes that part of the stator coil 30 which protrudes from the stator core 20 on the axial side thereof where the busbar unit 40 is arranged.

As shown in FIG. 4, each of the U-phase, V-phase and W-phase busbars 40U-40W is formed of a flat wire having a substantially rectangular cross-sectional shape. The U-phase, V-phase and W-phase busbars 40U-40W are stacked in the axial direction Y1 with the longer sides of rectangular cross sections of the busbars 40U-40W facing one another. That is, the U-phase, V-phase and W-phase busbars 40U-40W are stacked in the axial direction Y1 with major surfaces of the busbars 40U-40W facing one another. Here, the major surfaces denote those surfaces of the busbars 40U-40W which have a largest area among all the surfaces of the busbars 40U-40W. Moreover, the U-phase, V-phase and W-phase busbars 40U-40W are spaced from one another by a predetermined distance in the axial direction Y1. The resin member 60 is interposed between the U-phase, V-phase and W-phase busbars 40U-40W, thereby electrically insulating them from one another.

In the present embodiment, of the U-phase, V-phase and W-phase busbars 40U-40W, the V-phase busbar 40V is located closest to the stator core 20 in the axial direction Y1; the U-phase busbar 40U is located furthest from the stator core 20 in the axial direction Y1; and the W-phase busbar 40W is located between the V-phase busbar 40V and the U-phase busbar 40U in the axial direction Y1. In other words, the V-phase busbar 40V is a lower busbar; the W-phase busbar 40W is an intermediate busbar; and the U-phase busbar 40U is an upper busbar.

The V-phase busbar 40V has an arc shape in an axial view thereof. Moreover, the V-phase busbar 40V has two circumferential ends thereof located apart from each other by an angle of substantially 180° in the circumferential direction Y3. In circumferential end portions of the V-phase busbar 40V, there are formed four V-phase connection terminals 41V-44V to be respectively connected to the non-neutral-point-side end portions of the four partial windings 31V-34V of the V-phase winding 30V. More specifically, of the four V-phase connection terminals 41V-44V, the connection terminals 41V and 42V are formed in a first circumferential end portion of the V-phase busbar 40V; the remaining connection terminals 43V and 44V are formed in a second circumferential end portion of the V-phase busbar 40V. That is, the connection terminals 41V and 42V are located apart from the connection terminals 43V and 44V by an angle of substantially 180° in the circumferential direction Y3. In addition, in an axial view of the stator 10, the angle (or the amount of circumferential offset) between the connection terminals 41V and 42V is substantially equal to the angle (or the circumferential pitch) between the slots 23; the angle between the connection terminals 43V and 44V is also substantially equal to the angle between the slots 23 (see FIGS. 1 and 2).

Each of the V-phase connection terminals 41V-44V is formed at a radially outer periphery of the V-phase busbar 40V. More specifically, each of the V-phase connection terminals 41V-44V is bent to first protrude radially outward from the radially outer periphery of the V-phase busbar 40V and then axially extend to the opposite side to the stator core 20. Moreover, each of the V-phase connection terminals 41V-44V is formed to become thinner at a distal end portion thereof. To the distal end portions of the V-phase connection terminals 41V-44V, there are respectively joined the non-neutral-point-side end portions of the partial windings 31V-34V of the V-phase winding 30V by welding or the like.

The W-phase busbar 40W has an arc shape in an axial view thereof. Moreover, the W-phase busbar 40W has two circumferential ends thereof located apart from each other by an angle of substantially 180° in the circumferential direction Y3. In circumferential end portions of the W-phase busbar 40W, there are formed four W-phase connection terminals 41W-44W to be respectively connected to the non-neutral-point-side end portions of the four partial windings 31W-34W of the W-phase winding 30W. More specifically, the W-phase connection terminals 41W-44W are formed in the same manner as the V-phase connection terminals 41V-44V described above.

The W-phase busbar 40W is stacked on the upper side of the V-phase busbar 40V (i.e., on the opposite side of the V-phase busbar 40V to the stator core 20) in the axial direction Y1 so as to be offset counterclockwise from the V-phase busbar 40V by a predetermined angle α in the circumferential direction Y3. Consequently, of first and second circumferential ends of the W-phase busbar 40W, the first circumferential end does not overlap the V-phase busbar 40V. That is, the first circumferential end of the W-phase busbar 40W protrudes counterclockwise from the first circumferential end of the V-phase busbar 40V by the predetermined angle α while the second circumferential end of the V-phase busbar 40V protrudes clockwise from the second circumferential end of the W-phase busbar 40W by the predetermined angle α.

The U-phase busbar 40U has an arc shape in an axial view thereof. Moreover, the U-phase busbar 40U has two circumferential ends thereof located apart from each other by an angle of substantially 180° in the circumferential direction Y3. In circumferential end portions of the U-phase busbar 40U, there are formed four U-phase connection terminals 41U-44U to be respectively connected to the non-neutral-point-side end portions of the four partial windings 31U-

34U of the U-phase winding 30U. More specifically, the U-phase connection terminals 41U-44U are formed in the same manner as the V-phase connection terminals 41V-44V and the W-phase connection terminals 41W-44W described above.

The U-phase busbar 40U is stacked on the upper side of the W-phase busbar 40W (i.e., on the opposite side of the W-phase busbar 40W to the stator core 20) in the axial direction Y1 so as to be offset clockwise from the W-phase busbar 40W by (α×2) in the circumferential direction Y3, where a is the predetermined angle. That is, the U-phase busbar 40U is offset clockwise from the V-phase busbar 40V by the predetermined angle α in the circumferential direction Y3.

In the present embodiment, the neutral busbar 45 consists of a pair of first and second neutral busbars 451 and 452. Each of the first and second neutral busbars 451 and 452 has an arc shape in an axial view thereof. Moreover, each of the first and second neutral busbars 451 and 452 is shorter than the U-phase, V-phase and W-phase busbars 40U-40W and has a circumferential length corresponding to an angular range of (α×2), where a is the predetermined angle.

The first and second neutral busbars 451 and 452 are arranged apart from each other in the circumferential direction Y3. Specifically, the first neutral busbar 451 is arranged to protrude counterclockwise from the U-phase, V-phase and W-phase busbars 40U-40W. More particularly, in the present embodiment, the first neutral busbar 451 is offset counterclockwise by a predetermined angle from the W-phase busbar 40W that protrudes counterclockwise from both the U-phase and V-phase busbars 40U and 40V. Moreover, the second neutral busbar 452 is located on the opposite side of the central axis of the stator 10 (or the axis of rotation of the rotor) to the first neutral busbar 451. In other words, the second neutral busbar 452 is offset from the first neutral busbar 451 by 180° in the circumferential direction Y3.

In the first neutral busbar 451, there are formed six neutral connection terminals 51 to be respectively connected to the neutral-point-side end portions of the partial windings 31U and 32U of the U-phase winding 30U, the partial windings 33V and 34V of the V-phase winding 30V and the partial windings 33W and 34W of the W-phase winding 30W. In addition, as shown in FIG. 3, the neutral-point-side end portions of the partial windings 31U and 32U connected with the first neutral busbar 451 are respectively on the opposite side to the non-neutral-point-side end portions of the partial windings 31U and 32U connected with the U-phase busbar 40U; the neutral-point-side end portions of the partial windings 33V and 34V connected with the first neutral busbar 451 are respectively on the opposite side to the non-neutral-point-side end portions of the partial windings 33V and 34V connected with the V-phase busbar 40V; and the neutral-point-side end portions of the partial windings 33W and 34W connected with the first neutral busbar 451 are respectively on the opposite side to the non-neutral-point-side end portions of the partial windings 33W and 34W connected with the W-phase busbar 40W.

As shown in FIG. 4, the neutral connection terminals 51 are formed in pairs for respective phases; and the pairs of the neutral connection terminals 51 are offset from one another by the predetermined angle α in the circumferential direction Y3. Moreover, each of the neutral connection terminals 51 is formed at a radially inner periphery of the first neutral busbar 451. More specifically, each of the neutral connection terminals 51 is bent to first protrude radially inward from the radially inner periphery of the first neutral busbar 451 and then axially extend to the opposite side to the stator core 20.

To distal end portions of the neutral connection terminals 51, there are respectively joined the neutral-point-side end portions of the partial windings 31U, 32U, 33V, 34V, 33W and 34W by welding or the like. In addition, as shown in FIG. 6, a temperature sensor 80 is fixed to the first neutral busbar 451.

In the second neutral busbar 452, there are formed six neutral connection terminals 52 to be respectively connected to the neutral-point-side end portions of the partial windings 33U and 34U of the U-phase winding 30U, the partial windings 31V and 32V of the V-phase winding 30V and the partial windings 31W and 32W of the W-phase winding 30W. In addition, as shown in FIG. 3, the neutral-point-side end portions of the partial windings 33U and 34U connected with the second neutral busbar 452 are respectively on the opposite side to the non-neutral-point-side end portions of the partial windings 33U and 34U connected with the U-phase busbar 40U; the neutral-point-side end portions of the partial windings 31V and 32V connected with the second neutral busbar 452 are respectively on the opposite side to the non-neutral-point-side end portions of the partial windings 31V and 32V connected with the V-phase busbar 40V; and the neutral-point-side end portions of the partial windings 31W and 32W connected with the second neutral busbar 452 are respectively on the opposite side to the non-neutral-point-side end portions of the partial windings 31W and 32W connected with the W-phase busbar 40W.

As shown in FIG. 4, the neutral connection terminals 52 of the second neutral busbar 452 are formed in the same manner as the neutral connection terminals 51 of the first neutral busbar 451. Moreover, the second neutral busbar 452 is arranged apart from the first neutral busbar 451 in the circumferential direction Y3 so that the neutral connection terminals 51 and the neutral connection terminals 52 are symmetrically located with respect to a central axis of the cylindrical stator 10 (or the axis of rotation of the rotor).

In the present embodiment, the busbar unit 40 is formed by stacking all of the U-phase, V-phase and W-phase busbars 40U-40W and the neutral busbar 45 (i.e., the first and second neutral busbars 451 and 452) in the axial direction Y1 and covering them in the stacked state with the resin member 60 and thereby integrating them into one piece. As shown in FIG. 5, the resin member 60 covers the U-phase, V-phase and W-phase busbars 40U-40W and the neutral busbar 45 such that the connection terminals 41U-44U, 41V-44V, 41W-44W and 51-52 are exposed from the resin member 60. More specifically, each of the connection terminals 41U-44U, 41V-44V, 41W-44W and 51-52 protrudes from the resin member 60 radially inward or radially outward and then axially extends, in the exposed state, to the opposite side to the stator core 20.

The resin member 60 is formed in an arc shape along the circumferential direction Y3 to cover the busbars 40U-40W and 45. More specifically, the resin member 60 covers the busbars 40U-40W and 45 so as to have gaps between the busbars 40U-40W and 45 in the axial direction Y1 filled with the resin forming the resin member 60. Consequently, it becomes possible to keep the axial distances between the busbars 40U-40W and 45 constant, thereby electrically insulating them from one another.

In addition, as shown in FIG. 6, the resin member 60 is formed to cover part of the temperature sensor 80 as well; the temperature sensor 80 is fixed to the first neutral busbar 451. Moreover, in circumferential end portions of the resin member 60, there are respectively formed hooks 61 for temporarily fixing a lead wire 81 before connection of the lead wire 81 to the temperature sensor 80.

Next, a method of fixing the busbar unit 40 to the stator core 20 according to the present embodiment will be described in detail. As mentioned previously, in the present embodiment, the busbar unit 40 is fixed to the back yoke 21 of the stator core 20 by the first pins 101 and the second pins 103 (see FIG. 1).

Specifically, as shown in FIGS. 1 and 6, at opposite circumferential ends of the resin member 60 of the busbar unit 40, there are respectively provided a pair of first mounting members 111. Each of the first mounting members 111 is formed of a material harder than resin, such as iron, aluminum or stainless steel. Moreover, in each of the first mounting members 111, there is formed an insertion hole 112 along the axial direction Y1. Through the insertion hole 112, a corresponding one of the first pins 101 axially extends to fix the busbar unit 40 to the back yoke 21 of the stator core 20.

As shown in FIGS. 1 and 6-9, each of the first mounting members 111 has a substantially U-shape in an axial view thereof. Moreover, each of the first mounting members 111 is fixed to the resin member 60 with both opening ends thereof embedded in a circumferential end portion of the resin member 60. Consequently, at a circumferential end portion of the busbar unit 40, there is formed the insertion hole 112 which is surrounded by the first mounting member 111 and the resin member 60 and through which the corresponding first pin 101 can be inserted in the axial direction Y1.

Each of the first mounting members 111 is mounted to the resin member 60 with the opening direction thereof coinciding with the circumferential direction Y3. Consequently, in each of the first mounting members 111, the insertion hole 112 is formed to have an elongate shape along the circumferential direction Y3.

In addition, in the present embodiment, there are two first mounting members 111 mounted respectively to opposite circumferential end portions of the resin member 60; thus there are two insertion holes 112 formed respectively in opposite circumferential end portions of the busbar unit 40.

Figure 7A:
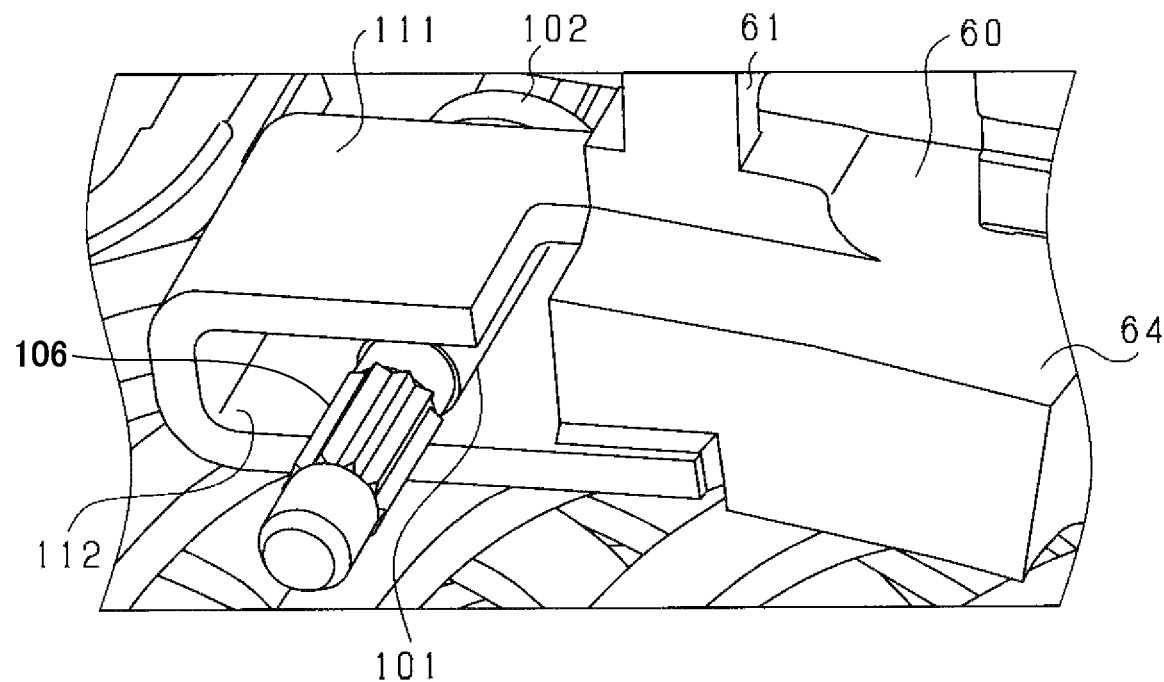
FIG. 7A is an enlarged perspective view showing a first mounting member in the busbar unit.
Figure 8:
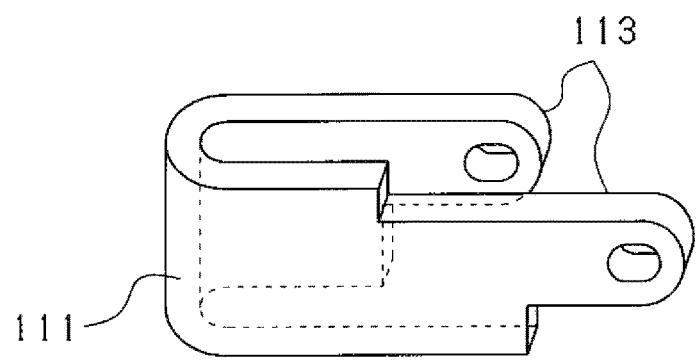
FIG. 8 is a perspective view of the first mounting member.

As shown in FIGS. 5 and 7A, the axial length of the first mounting members 111 is set so that after being fixed to the resin member 60, the first mounting members 111 protrude from a bottom surface 60a (i.e., a stator-core-side surface) of the resin member 60 in the axial direction Y1 to the stator core 20 side (i.e., the lower side in the axial direction Y1). Moreover, as shown in FIG. 8, each of the first mounting members 111 has a pair of protruding portions 113 that protrude respectively from the opening ends of the first mounting member 111 in the circumferential direction Y3; the protruding portions 113 are embedded in the resin member 60, thereby positioning the first mounting member 111 in the axial direction Y1.

Each of the first pins 101 is placed to extend along the axial direction Y1 through the insertion hole 112 of a corresponding one of the first mounting members 111. As shown in FIG. 2, in the stator core 20, there are formed a pair of first pin holes 25 respectively corresponding to the first pins 101. Each of the first pins 101 is press-fitted in a corresponding one of the first pin holes 25. In the present embodiment, each of the first pin holes 25 is formed in the back yoke 21 of the stator core 20 so as to be located between an adjacent pair of the slots 23 of the stator core 20 in the circumferential direction Y3. Moreover, the first pin holes 25 have a smaller diameter than distal end portions of the first pins 101. Furthermore, each of the first pins 101 has a collar-shaped head portion 102 formed at one axial end thereof.

Figure 7B:
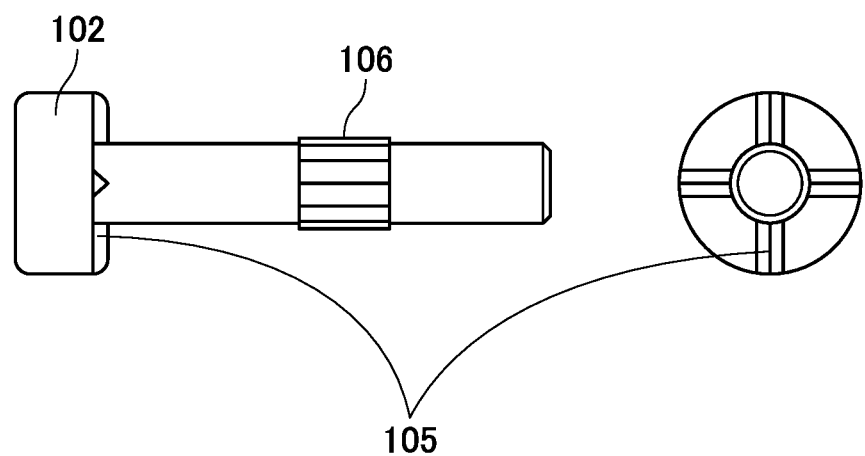
FIG. 7B is a schematic view showing first and second rotational-movement restraining mechanisms provided in a first pin.

In addition, as shown in FIGS. 7A and 7B, each of the first pins 101 has a first rotational-movement restraining mechanism 105 provided on a bearing surface of the head portion 102 thereof and a second rotational-movement restraining mechanism 106 provided on a body thereof. More particularly, in the present embodiment, the first rotational-movement restraining mechanism 105 is constituted of a plurality (e.g., four as shown in FIG. 7B) of protrusions that are formed on the bearing surface of the head portion 102 so as to radially extend from the body of the first pin 101. On the other hand, the second rotational-movement restraining mechanism 106 is constituted of a plurality of teeth that are formed on the body of the first pin 101 to extend along the longitudinal direction (or axial direction) of the first pin 101. It should be noted that though not depicted in FIG. 7A for the sake of simplicity, the teeth constituting the second rotational-movement restraining mechanism 106 are actually arranged to bite into the interior surface of the corresponding first mounting member 111.

Figure 9:
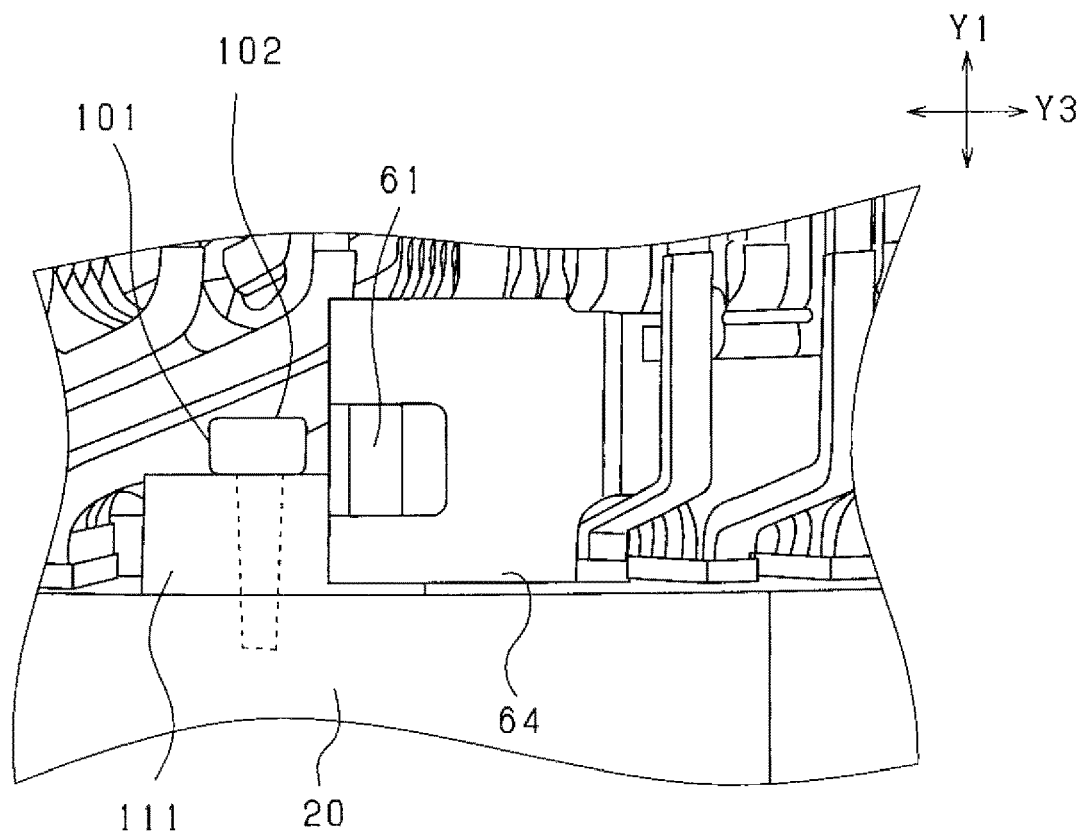
FIG. 9 is an enlarged plan view showing the first mounting member in the busbar unit.

When each of the first pins 101 is press-fitted into the corresponding first pin hole 25, as shown in FIG. 9, the collar-shaped head portion 102 of the first pin 101 engages with an upper part (i.e., a non-stator-core-side part) of the corresponding first mounting member 111 in the axial direction Y1, thereby pressing the corresponding first mounting member 111 downward in the axial direction Y1. Meanwhile, a lower part (i.e., a stator-core-side part) of the corresponding first mounting member 111 in the axial direction Y1 is brought into pressed contact with the stator core 20. Consequently, the busbar unit 40 is fixed by the first pins 101 so as to be axially immovable with respect to the stator core 20.

Moreover, as shown in FIG. 1, in each of the first mounting members 111, the insertion hole 112 is formed to have an elongate shape along the circumferential direction Y3; the width of the insertion hole 112 in a lateral direction thereof is set to be substantially equal to the diameter of the body of the corresponding first pin 101. Consequently, the first pins 101 radially engage with the insertion holes 112 of the corresponding first mounting members 111 respectively at two different locations in the circumferential direction Y3, thereby fixing the busbar unit 40 so as to be radially immovable with respect to the stator core 20.

Furthermore, before the fixing of the busbar unit 40 to the back yoke 21 of the stator core 20, the separation distance L1 (see FIG. 6) between the insertion holes 112 of the pair of first mounting members 111 provided respectively at opposite circumferential ends of the busbar unit 40 is different from the separation distance L2 (see FIG. 2) between the pair of first pin holes 25 formed in back yoke 21 of the stator core 20. More specifically, the separation distance L1 between the insertion holes 112 of the pair of first mounting members 111 is set to be longer than the separation distance L2 between the pair of first pin holes 25.

Therefore, when the first pins 101 are pressed-fitted into the corresponding first pin holes 25 through the insertion holes 112 of the corresponding first mounting members 111, the busbar unit 40 is bent (or deformed) to have the circumferential ends thereof become closer to each other in the circumferential direction Y3. Consequently, the busbar unit 40 is fixed, in a state of being urged by an elastic force to spread in the circumferential direction Y3, to the back yoke 21 of the stator core 20.

As shown in FIGS. 1 and 6, in the busbar unit 40, there are formed a pair of recessed portions 62 respectively at two different positions closer to the circumferential center of the busbar unit 40 than to the corresponding circumferential ends of the busbar unit 40; the recessed portions 62 are recessed radially outward from a radially inner periphery of the busbar unit 40. Each of the recessed portions 62 is formed by bending (or shifting) a portion of the busbar unit 40 radially outward keeping the radial width thereof unchanged. Moreover, each of the recessed portions 62 is located on the opposite side of the central axis of the stator 10 (or the axis of rotation of the rotor) to a corresponding one of the first mounting members 111. In other words, each of the recessed portions 62 is offset by 180° in the circumferential direction Y3 from a corresponding one of the first mounting members 111. In addition, as shown in FIG. 4, at the positions where the recessed portions 62 are respectively formed, each of the U-phase, V-phase and W-phase busbars 40U-40W included in the busbar unit 40 also has portions thereof bent (or shifted) radially outward keeping the radial width thereof unchanged.

With the recessed portions 62 formed in the bus bar unit 40, the back yoke 21 of the stator core 20 does not overlap the busbar unit 40, but is exposed from the busbar unit 40 at the recessed portions 62 when viewed along the axial direction Y1. Moreover, in the recessed portions 62, there are respectively mounted a pair of second mounting members 121. In addition, the recessed portions 62 of the busbar unit 40 are formed so as to have a pair of second pin holes 26 exposed from the busbar unit 40. As will be described in detail latter, the second pin holes 25 are formed in the back yoke 21 of the stator core 20 to have the second pins 103 respectively pressed-fitted therein.

Figure 10:
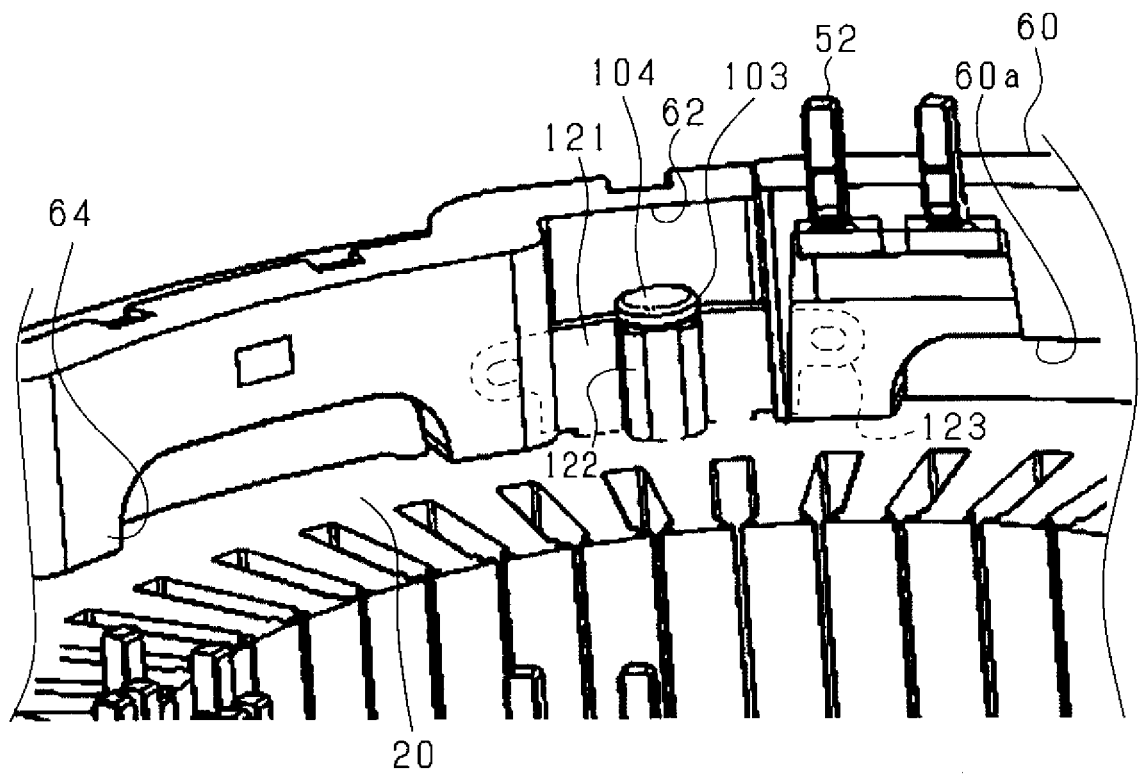
FIG. 10 is an enlarged perspective view showing a second mounting member in the busbar unit.

Each of the second mounting members 121 is formed of a material harder than resin, such as iron, aluminum or stainless steel. As shown in FIGS. 6 and 10, each of the second mounting members 121 is a plate-shaped member which is arranged along the circumferential direction Y3 and extends in the axial direction Y1. Moreover, each of the second mounting members 121 has an engaging recess 122 formed at a circumferential center thereof so as to be recessed radially inward. As shown in FIG. 1, each of the second mounting members 121 has a substantially U-shape in an axial view thereof. Moreover, each of the second mounting members 121 has a pair of flange portions protruding circumferentially outward respectively from a pair of opening ends thereof. In addition, each of the second mounting members 121 has both circumferential ends thereof embedded in the resin member 60, thereby being fixed to the resin member 60.

As shown in FIG. 10, the axial length of the second mounting members 121 is set so that after being fixed to the resin member 60, the second mounting members 121 protrude from the bottom surface 60a (i.e., the stator-core-side surface) of the resin member 60 in the axial direction Y1 to the stator core 20 side (i.e., the lower side in the axial direction Y1). More specifically, the axial length of the second mounting members 121 is set so that lower parts of the second mounting members 121 are located at substantially the same axial position as the lower parts of the first mounting members 111.

Moreover, as shown in FIG. 10, each of the second mounting members 121 has a pair of protruding portions 123 (shown by dashed lines in FIG. 10) that protrude respectively from the flange portions of the second mounting member 121 in the circumferential direction Y3; the protruding portions 123 are embedded in the resin member 60, thereby positioning the second mounting member 121 in the axial direction Y1.

As mentioned previously, each of the second pins 103 is press-fitted in a corresponding one of the second pin holes 26. As shown in FIG. 2, in the present embodiment, each of the second pin holes 26 is located on the opposite side of the central axis of the stator 10 (or the axis of rotation of the rotor) to a corresponding one of the first pin holes 25. In other words, each of the second pin holes 26 is offset by 180° in the circumferential direction Y3 from a corresponding one of the first pin holes 25. Moreover, each of the second pin holes 26 is formed in the back yoke 21 of the stator core 20 so as to be located between an adjacent pair of the slots 23 of the stator core 20 in the circumferential direction Y3. Furthermore, the second pin holes 26 have a smaller diameter than distal end portions of the second pins 103. In addition, similar to the first pins 101, each of the second pins 103 has a collar-shaped head portion 104 formed at one axial end thereof; though not shown in the drawings, each of the second pins 103 also has a first rotational-movement restraining mechanism 105 provided on a bearing surface of the head portion 104 thereof and a second rotational-movement restraining mechanism 106 provided on a body thereof.

When each of the second pins 103 is press-fitted into the corresponding second pin hole 26, as shown in FIG. 10, the collar-shaped head portion 104 of the second pin 103 engages with an upper part (i.e., a non-stator-core-side part) of the corresponding second mounting member 121 in the axial direction Y1, thereby pressing the corresponding second mounting member 121 downward in the axial direction Y1. Meanwhile, the lower part (i.e., the stator-core-side part) of the corresponding second mounting member 121 in the axial direction Y1 is brought into pressed contact with the stator core 20. Consequently, the busbar unit 40 is fixed also by the second pins 103 so as to be axially immovable with respect to the stator core 20.

Moreover, when each of the second pins 103 is press-fitted into the corresponding second pin hole 26, the body of the second pin 103 is received in the engaging recess 122 formed in the corresponding second mounting member 121, thereby engaging with internal walls of the corresponding second mounting member 121 which define the engaging recess 122. Consequently, the resin member 60 and thus the busbar unit 40 are fixed by the second pins 103 so as to be immovable in the circumferential direction Y3 with respect to the stator core 20.

Figure 11:
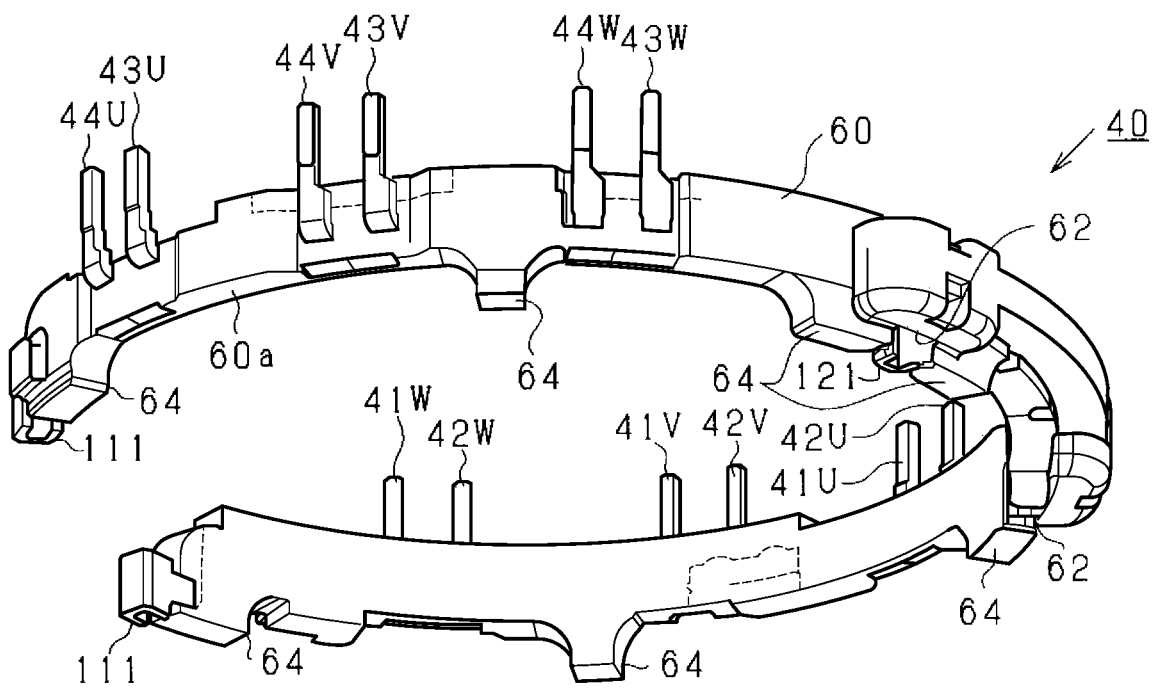
FIG. 11 is a perspective view of the busbar unit from the bottom side thereof.

As shown in FIG. 11, on the bottom surface 60a (i.e., the stator-core-side surface) of the resin member 60, there are formed a plurality of leg portions 64 that protrude from the bottom surface 60a in the axial direction Y1 to the stator core 20 side (i.e., the lower side in the axial direction Y1). The leg portions 64 serve as elastically-deformable buffer members. More specifically, the leg portions 64 are respectively formed in both the circumferential end portions of the resin member 60, on both the circumferential sides of each of the recessed portions 62, and between each adjacent pair of the circumferential end portions of the resin member 60 and the recessed portions 62. The axial length of the leg portions 64 is set so that after the first and second mounting members 111 and 121 are fixed to the resin member 60, the bottom surfaces of the leg portions 64 are located at substantially the same axial position as or at a slightly upper position in the axial direction Y1 than the lower parts of the first and second mounting members 111 and 121 (see FIGS. 7A and 9).

When the resin member 60 is axially bent (or deformed), the leg portions 64 will make contact with the stator core 20, thereby suppressing the axial bending of the resin member 60. For example, when those parts of the resin member 60 which are located between the circumferential end portions of the resin member 60 and the recessed portions 62 are axially bent, the leg portions 64 formed between the circumferential end portions of the resin member 60 and the recessed portions 62 will make contact with the stator core 20, thereby suppressing the axial bending of the resin member 60. Moreover, when that part of the resin member 60 which is located between the pair of recessed portions 62 is axially bent, the leg portions 64 formed between the pair of recessed portions 62 will make contact with the stator core 20, thereby suppressing the axial bending of the resin member 60.

In addition, the leg portions 64 are formed integrally with the resin member 60. That is, the leg portions 64 are formed of a resin material and thus elastic. Therefore, when the leg portions 64 make contact with the stator core 20, the mechanical shock can be absorbed by the leg portions 64, thereby suppressing vibration of the busbar unit 40.

According to the present embodiment, it is possible to achieve the following advantageous effects.

In the present embodiment, the stator (or armature) 10 includes the annular stator core (or armature core) 20, the three-phase stator coil (or armature coil) 30 wound on the stator core 20, and the busbar unit 40 configured to connect the winding end portions of the stator coil 30 which are arranged apart from one another in the circumferential direction Y3 (more particularly, the end portions of the partial windings 31U-34U of the U-phase winding 30U, the end portions of the partial windings 31V-34V of the V-phase winding 30V and the end portions of the partial windings 31W-34W of the W-phase winding 30W in the present embodiment). The busbar unit 40 is fixed to the back yoke 21 of the stator core 20 by the first and second pins 101 and 103.

With the above configuration, it becomes possible to fix the busbar unit 40 to the back yoke 21 of the stator core 20, thereby suppressing vibration of the busbar unit 40. Moreover, with the busbar unit 40 fixed to the back yoke 21 of the stator core 20, it becomes possible to prevent a load such as vibration or the like from being directly applied to the joints between the winding end portions of the stator coil 30 and the U-phase, V-phase and W-phase busbars 40U-40W and the neutral busbar 45. Furthermore, it is easy to form the pins 101 and 103 to be more elongate than screws. With the busbar unit 40 fixed to the back yoke 21 of the stator core 20 by the elongate pins 101 and 103, it becomes possible to suppress the pins 101 and 103 from impeding the flow of magnetic flux through the back yoke 21 of the stator core 20. In addition, with the elongate pins 101 and 103, it also becomes possible to fix the busbar unit 40 to such as a narrow area as the back core 21.

Moreover, in the present embodiment, the busbar unit 40 includes the pair of first mounting members 111 each of which has the insertion hole 112 formed along the axial direction Y1. The stator core 20 has the pair of first pin holes 25 formed in the back yoke 21 thereof. The pins 101 and 103 used for fixing the busbar unit 40 to the back yoke 21 of the stator core 20 include the pair of first pins 101 each of which has the collar-shaped head portion 102 formed at one end thereof. Each of the first pins 101 is inserted through the insertion hole 112 of a corresponding one of the first mounting members 111 and has the distal end portion thereof press-fitted in a corresponding one of the first pin holes 25. Each of the first mounting members 111 is placed in pressed contact with the stator core 20 by being pressed by the head portion 102 of the corresponding first pin 101 to the stator core 20 side in the axial direction Y1.

With the above configuration, it becomes possible to prevent the busbar unit 40 and the stator core 20 from being displaced relative to each other. Further, it also becomes possible to suppress vibration of the busbar unit 40 and the application of a load to the joints between the winding end portions of the stator coil 30 and the busbars 40U-40W and 45 due to displacement of the busbar unit 40 relative to the stator core 20. Moreover, forming the first mounting members 111 with a material (e.g., iron, aluminum or stainless steel) harder than resin, it is possible to more effectively suppress vibration of the busbar unit 40 and displacement of the busbar unit 40 relative to the stator core 20.

In the present embodiment, the busbar unit 40 is formed in the arc shape along the circumferential direction Y3. The pair of first mounting members 111 are provided respectively at opposite circumferential ends of the busbar unit 40. Before the fixing of the busbar unit 40 to the back yoke 21 of the stator core 20, the separation distance L1 (see FIG. 6) between the insertion holes 112 of the pair of first mounting members 111 is different from the separation distance L2 (see FIG. 2) between the pair of first pin holes 25 formed in the back yoke 21 of the stator core 20. More specifically, the separation distance L1 between the insertion holes 112 of the pair of first mounting members 111 is set to be longer than the separation distance L2 between the pair of first pin holes 25.

With the above configuration, when the first pins 101 are pressed-fitted into the corresponding first pin holes 25 through the insertion holes 112 of the corresponding first mounting members 111, the busbar unit 40 is bent (or deformed) to have the circumferential ends thereof become closer to each other in the circumferential direction Y3. Consequently, the busbar unit 40 is fixed, in a state of being urged by an elastic force to spread in the circumferential direction Y3, to the back yoke 21 of the stator core 20. As a result, it becomes possible to suppress, with the elastic force, vibration of the busbar unit 40. Moreover, it also becomes possible to increase the frictional force between the first pins 101 and the insertion holes 112 of the corresponding first mounting members 111, thereby more effectively suppressing displacement of the busbar unit 40 relative to the stator core 20.

In the present embodiment, the pair of first mounting members 111 are provided respectively at opposite circumferential ends of the busbar unit 40 along the circumferential direction Y3. Each of the insertion holes 112 of the first mounting members 111 is formed to have the elongate shape along the circumferential direction Y3 so as to allow circumferential movement of the corresponding first pin 101 in the insertion hole 112 while restraining radial movement of the corresponding first pin 101.

With the above configuration, each of the first mounting members 111 extends along the circumferential direction Y3 without protruding radially outward. Consequently, it becomes possible to minimize the size of the busbar unit 40. Moreover, with circumferential play (or clearance) provided in each of the insertion holes 112 of the first mounting members 111, it becomes easy to adjust the circumferential position of the busbar unit 40, facilitating the fixing of the busbar unit 40 to the back yoke 21 of the stator core 20. For example, it becomes easy to adjust the circumferential position of the busbar unit 40 in the process of joining the winding end portions of the stator coil 30 to the U-phase, V-phase and W-phase busbars 40U-40W and the neutral busbar 45.

In the present embodiment, in the busbar unit 40, there are formed the pair of recessed portions 62 that are recessed radially outward from the radially inner periphery of the busbar unit 40 and located respectively at two different positions closer to the circumferential center of the busbar unit 40 than to the corresponding circumferential ends of the busbar unit 40. The busbar unit 40 further includes the pair of second mounting members 121 that are received respectively in the pair of recessed portions 62. Each of the second mounting members 121 has the engaging recess 122 that is recessed radially inward. The stator core 20 further has the pair of second pin holes 26 formed in the back yoke 21 thereof. The pins 101 and 103 used for fixing the busbar unit 40 to the back yoke 21 of the stator core 20 also include the pair of second pins 103 each of which has the collar-shaped head portion 104 formed at one end thereof. Each of the second pins 103 has the head portion 104 thereof axially engaging with a corresponding one of the second mounting members 121, the body thereof received in the engaging recess 122 of the corresponding second mounting member 121 so as to circumferentially engage with the corresponding second mounting member 121, and the distal end portion thereof press-fitted in a corresponding one of the second pin holes 26. Each of the second mounting members 121 is placed in pressed contact with the stator core 20 by being pressed by the head portion 104 of the corresponding second pin 103 to the stator core 20 side in the axial direction Y1.

With the above configuration, it becomes possible to suppress circumferential displacement of the busbar unit 40 relative to the stator core 20. Consequently, it becomes possible to prevent the joints between the winding end portions of the stator coil 30 and the busbars 40U-40W and 45 from being damaged due to circumferential displacement of the busbar unit 40 relative to the stator core 20. As a result, it becomes possible to prevent the winding end portions of the stator coil 30 from being detached from the busbars 40U-40W and 45.

In the present embodiment, the stator core 20 has the slots 23 formed at predetermined intervals in the circumferential direction Y3. The stator coil 30 is wound on the stator core 20 so as to be received in the slots 23 of the stator core 20. In the back yoke 21 of the stator core 20, there are formed the first and second pin holes 25 and 26 in which the distal end portions of the first and second pins 101 and 103 are respectively fitted. Each of the first and second pin holes 25 and 26 is located between an adjacent pair of the slots 23 of the stator core 20 in the circumferential direction Y3.

With the above configuration, it becomes possible to prevent the first and second pin holes 25 and 26 from impeding the flow of magnetic flux through the back yoke 21 of the stator core 20. Moreover, the radial thickness of those portions of the stator core 20 which are located between the slots 23 in the circumferential direction Y3 is larger than the radial thickness of those portions of the stator core 20 where the slots 23 are respectively formed. In other words, those portions of the stator core 20 where the teeth 22 are respectively formed have a larger radial thickness than those portions of the stator core 20 where the slots 23 are respectively formed. Therefore, with the above location of the first and second pin holes 25 and 26, it is possible to ensure sufficient strength of the stator core 20.

In the present embodiment, in the busbar unit 40, there are formed the leg portions 64 to protrude from the bottom surface 60a (i.e., the stator-core-side surface) of the resin member 60 to the stator core 20 side in the axial direction Y1. The leg portions 64 are configured as elastically-deformable buffer members to absorb mechanical shock when they make contact with the stator core 20.

With the above configuration, when the resin member 60 is axially bent (or deformed), the leg portions 64 will make contact with the stator core 20, thereby suppressing the axial bending of the resin member 60. Consequently, it will be possible to prevent the joints between the winding end portions of the stator coil 30 and the busbars 40U-40W and 45 from being damaged due to the axial bending of the resin member 60. As a result, it will be possible to prevent the winding end portions of the stator coil 30 from being detached from the busbars 40U-40W and 45.

In addition, in the present embodiment, the leg portions 64 are formed integrally with the resin member 60. That is, the leg portions 64 are formed of a resin material and thus elastic. Therefore, when the leg portions 64 make contact with the stator core 20, the mechanical shock can be absorbed by the leg portions 64, thereby suppressing vibration of the busbar unit 40.

In the present embodiment, the first and second pin holes 25 and 26 have a smaller diameter than the distal end portions of the first and second pins 101 and 103. Consequently, it becomes possible to reliably press-fit the distal end portions of the first and second pins 101 and 103 respectively into the first and second pin holes 25 and 26.

In the present embodiment, each of the first and second pins 101 and 103 has the collar-shaped head portion 102 or 104 formed at one end thereof. Moreover, each of the first and second pins 101 and 103 has the first rotational-movement restraining mechanism 105 provided on the bearing surface of the head portion 102 or 104 thereof and the second rotational-movement restraining mechanism 106 provided on the body thereof. Consequently, with the first and second rotational-movement restraining mechanisms 105 and 106, it becomes possible to prevent the first and second pins 101 and 103 from being loosened due to rotational movement thereof.

While the above particular embodiment has been shown and described, it will be understood by those skilled in the art that various modifications, changes and improvements may be made without departing from the spirit of the present disclosure.

For example, in the above-described embodiment, the neutral busbar 45 is integrated, together with the U-phase, V-phase and W-phase busbars 40U-40W, into the busbar unit 40. Alternatively, the neutral busbar 45 may not be integrated into the busbar unit 40.

In the above-described embodiment, the U-phase, V-phase and W-phase busbars 40U-40W are stacked in the axial direction Y1 in the order of the V-phase busbar 40V, the W-phase busbar 40W and the U-phase busbar 40U from the stator core 20 side. However, the stacking order of the U-phase, V-phase and W-phase busbars 40U-40W may be arbitrarily changed.

In the above-described embodiment, the U-phase, V-phase and W-phase busbars 40U-40W are offset from one another by the predetermined angle α in the circumferential direction Y3. Alternatively, the U-phase, V-phase and W-phase busbars 40U-40W may not be offset from one another in the circumferential direction Y3.

In the above-described embodiment, all of the U-phase connection terminals 41U-44U are formed at the radially outer periphery of the U-phase busbar 40U; all of the V-phase connection terminals 41V-44V are formed at the radially outer periphery of the V-phase busbar 40V; and all of the W-phase connection terminals 41W-44W are formed at the radially outer periphery of the W-phase busbar 40W. As an alternative, all of the U-phase connection terminals 41U-44U may be formed at the radially inner periphery of the U-phase busbar 40U; all of the V-phase connection terminals 41V-44V may be formed at the radially inner periphery of the V-phase busbar 40V; and all of the W-phase connection terminals 41W-44W may be formed at the radially inner periphery of the W-phase busbar 40W. As another alternative, at each of the radially inner and radially outer peripheries of the U-phase busbar 40U, there may be formed at least one of the U-phase connection terminals 41U-44U; at each of the radially inner and radially outer peripheries of the V-phase busbar 40V, there may be formed at least one of the V-phase connection terminals 41V-44V; at each of the radially inner and radially outer peripheries of the W-phase busbar 40W, there may be formed at least one of the W-phase connection terminals 41W-44W. In either case, it is still possible to minimize the size of the busbar unit 40 and strengthen the connection thereof with the stator coil 30.

In the above-described embodiment, the rotating electric machine is configured as an electric motor for use in a vehicle. However, the rotating electric machine may alternatively be configured as an electric motor for other uses, for example as an electric motor for use in an aircraft.

In the above-described embodiment, each of the first mounting members 111 is substantially U-shaped and has both the opening ends thereof embedded in the resin member 60, thereby forming the insertion hole 112 thereof. As an alternative, each of the first mounting members 111 may be flat plate-shaped and have a through-hole formed therein as the insertion hole 112. As another alternative, the insertion holes 112 may be formed in the resin member 60 instead of in the first mounting members 111.

In the above-described embodiment, the shape of the insertion holes 112 may be arbitrarily changed. For example, the insertion holes 112 may be formed as circular holes whose diameter is substantially equal to the diameter of the bodies of the first pins 101.

In the above-described embodiment, in each of the second mounting members 121, the engaging recess 122 is formed so as to be recessed radially inward. However, the engaging recess 122 may alternatively be formed so as to be recessed radially outward.

In the above-described embodiment, before the fixing of the busbar unit 40 to the back yoke 21 of the stator core 20, the separation distance L1 between the insertion holes 112 of the pair of first mounting members 111 provided respectively at opposite circumferential ends of the busbar unit 40 is longer than the separation distance L2 between the pair of first pin holes 25 formed in back yoke 21 of the stator core 20. As an alternative, the separation distance L1 may be equal to the separation distance L2 before the fixing of the busbar unit 40 to the back yoke 21 of the stator core 20. As another alternative, the separation distance L1 may be shorter than the separation distance L2 before the fixing of the busbar unit 40 to the back yoke 21 of the stator core 20.

In the above-described embodiment, before the fixing of the busbar unit 40 to the back yoke 21 of the stator core 20, the separation distance (or interval) L3 (see FIG. 6) between each circumferentially-adjacent pair of one of the insertion holes 112 of the first mounting members 111 and one of the engaging recesses 122 of the second mounting members 121 may be different from the separation distance L4 (see FIG. 2) between each circumferentially-adjacent pair of one of the first pin holes 25 and one of the second pin holes 26. In this case, it would be possible to have those portions of the busbar unit 40, each of which is located between a circumferentially-adjacent pair of one of the insertion holes 112 and one of the engaging recesses 122, bent during the fixing of the busbar unit 40 to the back yoke 21 of the stator core 20. Consequently, the busbar unit 40 would be fixed, in a state of being urged by an elastic force to spread in the circumferential direction Y3, to the back yoke 21 of the stator core 20. As a result, it would become possible to suppress, with the elastic force, vibration of the busbar unit 40.

Moreover, in the case of forming the engaging recesses 122 of the second mounting members 121 to be recessed radially inward as in the above-described embodiment, it is preferable that the separation distance L3 is longer than the separation distance L4. Consequently, it would become possible to reliably have the second pins 103 received in and engaging with the engaging recesses 122 of the corresponding second mounting members 121.

In the above-described embodiment, the leg portions 64 may alternatively be formed to protrude from the first and second mounting members 111 and 121 downward (i.e., to the stator core 20 side) in the axial direction Y1. In this case, when the busbar unit 40 is fixed by the first and second pins 101 and 103 to the back yoke 21 of the stator core 20 via the first and second mounting members 111 and 121, the leg portions 64 would be elastically deformed and reliably brought into pressed contact with the stator core 20. Consequently, it would become possible to reliably suppress the bending (or deformation) of the busbar unit 40.

In the above-described embodiment, each of the first and second pins 101 and 103 has the first rotational-movement restraining mechanism 105 provided on the bearing surface of the head portion 102 or 104 thereof and the second rotational-movement restraining mechanism 106 provided on the body thereof. As an alternative, each of the first and second pins 101 and 103 may have only one of the first and second rotational-movement restraining mechanisms 105 and 106 provided therein. As another alternative, each of the first and second pins 101 and 103 may have neither of the first and second rotational-movement restraining mechanisms 105 and 106 provided therein.

What is claimed is:
1. A rotating electric machine, comprising:
an armature including an annular armature core and a multi-phase armature coil wound on the armature core; and
a busbar unit configured to connect winding end portions of the armature coil which are arranged apart from one another in a circumferential direction of the armature, wherein:
the busbar unit is fixed to a back yoke of the armature core by a plurality of pins;
the busbar unit includes a pair of first mounting members provided respectively at opposite circumferential ends of the busbar unit, each of the pair of first mounting members having an insertion hole formed along an axial direction of the armature;
the armature core has a pair of first pin holes that are formed in the back yoke thereof and respectively correspond to the pair of first mounting members;
the plurality of pins comprise a pair of first pins that respectively correspond to the pair of first mounting members and to the pair of first pin holes and that each have a collar-shaped head portion formed at one end thereof;
each of the pair of first pins is inserted through the insertion hole of the corresponding first mounting member and has a distal end portion thereof press-fitted in the corresponding first pin hole;
each of the first mounting members is in pressed contact with the armature core by being pressed by the collar- shaped head portion of the corresponding first pin to an armature core side in the axial direction;

the busbar unit is formed in an arc shape along the circumferential direction; and a distance between the pair of first pin holes is different from a distance between the insertion holes of the pair of first mounting members before fixing of the busbar unit to the back yoke of the armature core.

2. The rotating electric machine as set forth in claim 1, wherein:

the armature core has a plurality of slots formed at predetermined intervals in the circumferential direction;

the armature coil is wound on the armature core so as to be received in the slots of the armature core;

the back yoke of the armature core includes a plurality of pin holes in which distal end portions of the plurality of pins are respectively fitted; and each of the plurality of pin holes is located between an adjacent pair of the slots of the armature core in the circumferential direction.

3. The rotating electric machine as set forth in claim 1, wherein the busbar unit includes at least one elastically-deformable buffer member that protrudes from an armature-core-side surface of the busbar unit to the armature core side in the axial direction, and the elastically-deformable buffer member is configured to absorb mechanical shock when it makes contact with the armature core.

4. The rotating electric machine as set forth in claim 1, wherein the back yoke portion of the armature core includes a plurality of pin holes in which distal end portions of the plurality of pins are respectively fitted, and the plurality of pin holes have a smaller diameter than the distal end portions of the plurality of pins.

5. The rotating electric machine as set forth in claim 1, wherein the armature coil includes a plurality of phase windings for respective phases, and the busbar unit includes a plurality of busbars each of which is configured to connect the winding end portions of a corresponding one of the phase windings of the armature coil.

6. A rotating electric machine, comprising:

an armature including an annular armature core and a multi-phase armature coil wound on the armature core; and a busbar unit configured to connect winding end portions of the armature coil which are arranged apart from one another in a circumferential direction of the armature, wherein:

the busbar unit is fixed to a back yoke of the armature core by a plurality of pins;

the busbar unit includes a pair of first mounting members provided respectively at opposite circumferential ends of the busbar unit along the circumferential direction, each of the pair of first mounting members having an insertion hole formed along an axial direction of the armature;

the armature core has a pair of first pin holes that are formed in the back yoke thereof and respectively correspond to the pair of first mounting members;

the plurality of pins comprise a pair of first pins that respectively correspond to the pair of first mounting members and to the pair of first pin holes and that each have a collar-shaped head portion formed at one end thereof;

each of the pair of first pins is inserted through the insertion hole of the corresponding first mounting member and has a distal end portion thereof press-fitted in the corresponding first pin hole;

each of the first mounting members is in pressed contact with the armature core by being pressed by the collar-shaped head portion of the corresponding first pin to an armature core side in the axial direction;

the busbar unit is formed in an arc shape along the circumferential direction; and each of the insertion holes of the first mounting members is formed to have an elongate shape along the circumferential direction so as to allow circumferential movement of the corresponding first pin in the insertion hole while restraining radial movement of the corresponding first pin.

7. The rotating electric machine as set forth in claim 6, wherein:

the armature core has a plurality of slots formed at predetermined intervals in the circumferential direction;

the armature coil is wound on the armature core so as to be received in the slots of the armature core;

the back yoke of the armature core includes a plurality of pin holes in which distal end portions of the plurality of pins are respectively fitted; and each of the plurality of pin holes is located between an adjacent pair of the slots of the armature core in the circumferential direction.

8. The rotating electric machine as set forth in claim 6, wherein the busbar unit includes at least one elastically-deformable buffer member that protrudes from an armature-core-side surface of the busbar unit to the armature core side in the axial direction, and the elastically-deformable buffer member is configured to absorb mechanical shock when it makes contact with the armature core.

9. The rotating electric machine as set forth in claim 6, wherein the back yoke portion of the armature core includes a plurality of pin holes in which distal end portions of the plurality of pins are respectively fitted, and the plurality of pin holes have a smaller diameter than the distal end portions of the plurality of pins.

10. The rotating electric machine as set forth in claim 6, wherein the armature coil includes a plurality of phase windings for respective phases, and the busbar unit includes a plurality of busbars each of which is configured to connect the winding end portions of a corresponding one of the phase windings of the armature coil.

11. A rotating electric machine, comprising:

an armature including an annular armature core and a multi-phase armature coil wound on the armature core; and a busbar unit configured to connect winding end portions of the armature coil which are arranged apart from one another in a circumferential direction of the armature, wherein:

the busbar unit is fixed to a back yoke of the armature core by a plurality of pins;

the busbar unit includes at least one first mounting member that has an insertion hole formed along an axial direction of the armature;
the armature core has at least one first pin hole formed in the back yoke thereof;
the plurality of pins comprise at least one first pin that has a collar-shaped head portion formed at one end thereof;
the first pin is inserted through the insertion hole of the first mounting member and has a distal end portion thereof press-fitted in the first pin hole;
the first mounting member is in pressed contact with the armature core by being pressed by the collar-shaped head portion of the first pin to an armature core side in the axial direction;
the busbar unit is formed in an arc shape along the circumferential direction;
the busbar unit includes at least one recessed portion that is recessed radially outward from a radially inner periphery of the busbar unit and is located closer to a circumferential center of the busbar unit than to a circumferential end of the busbar unit;
the busbar unit further includes at least one second mounting member that is received in the recessed portion of the busbar unit;
the second mounting member has an engaging recess that is radially recessed;
the armature core further has at least one second pin hole formed in the back yoke thereof;
the plurality of pins also comprise at least one second pin that has a collar-shaped head portion formed at one end thereof;
the collar-shaped head portion of the second pin is axially engaged with the second mounting member, a body of the second pin is received in the engaging recess of the second mounting member so as to circumferentially engage with the second mounting member, and a distal end portion of the second pin is press-fitted in the second pin hole; and
the second mounting member is in pressed contact with the armature core by being pressed by the collar-shaped head portion of the second pin to the armature core side in the axial direction.

12. The rotating electric machine as set forth in claim 11, wherein a distance between the insertion hole of the first mounting member and the engaging recess of the second mounting member before fixing of the busbar unit to the back yoke of the armature core is different from a distance between the first pin hole and the second pin hole.

13. The rotating electric machine as set forth in claim 11, wherein:
the armature core has a plurality of slots formed at predetermined intervals in the circumferential direction;
the armature coil is wound on the armature core so as to be received in the slots of the armature core;
the back yoke of the armature core includes a plurality of pin holes in which distal end portions of the plurality of pins are respectively fitted; and
each of the plurality of pin holes is located between an adjacent pair of the slots of the armature core in the circumferential direction.

14. The rotating electric machine as set forth in claim 11, wherein
the busbar unit includes at least one elastically-deformable buffer member that protrudes from an armature-core-side surface of the busbar unit to the armature core side in the axial direction, and
the elastically-deformable buffer member is configured to absorb mechanical shock when it makes contact with the armature core.

15. The rotating electric machine as set forth in claim 11, wherein
the back yoke portion of the armature core includes a plurality of pin holes in which distal end portions of the plurality of pins are respectively fitted, and
the plurality of pin holes have a smaller diameter than the distal end portions of the plurality of pins.

16. The rotating electric machine as set forth in claim 11, wherein
the armature coil includes a plurality of phase windings for respective phases, and
the busbar unit includes a plurality of busbars each of which is configured to connect the winding end portions of a corresponding one of the phase windings of the armature coil.

17. A rotating electric machine comprising:
an armature including an annular armature core and a multi-phase armature coil wound on the armature core; and
a busbar unit configured to connect winding end portions of the armature coil which are arranged apart from one another in a circumferential direction of the armature, wherein:
the busbar unit is fixed to a back yoke of the armature core by a plurality of pins;
each of the plurality of pins has a collar-shaped head portion formed at one end thereof; and
each of the plurality of pins has at least one of a first rotational-movement restraining mechanism provided on a bearing surface of the collar-shaped head portion thereof and a second rotational-movement restraining mechanism provided on a body thereof.

18. The rotating electric machine as set forth in claim 17, wherein:
the armature core has a plurality of slots formed at predetermined intervals in the circumferential direction;
the armature coil is wound on the armature core so as to be received in the slots of the armature core;
the back yoke of the armature core includes a plurality of pin holes in which distal end portions of the plurality of pins are respectively fitted; and
each of the plurality of pin holes is located between an adjacent pair of the slots of the armature core in the circumferential direction.

19. The rotating electric machine as set forth in claim 17, wherein
the busbar unit includes at least one elastically-deformable buffer member that protrudes from an armature-core-side surface of the busbar unit to the armature core side in the axial direction, and
the elastically-deformable buffer member is configured to absorb mechanical shock when it makes contact with the armature core.

20. The rotating electric machine as set forth in claim 17, wherein
the back yoke portion of the armature core includes a plurality of pin holes in which distal end portions of the plurality of pins are respectively fitted, and
the plurality of pin holes have a smaller diameter than the distal end portions of the plurality of pins.

21. The rotating electric machine as set forth in claim 17, wherein the armature coil includes a plurality of phase windings for respective phases, and the busbar unit includes a plurality of busbars each of which is configured to connect the winding end portions of a corresponding one of the phase windings of the armature coil.

* * * * *